S. P. BABCOCK.
HAND PLANTER.
No. 183,527. Patented Oct. 24, 1876.
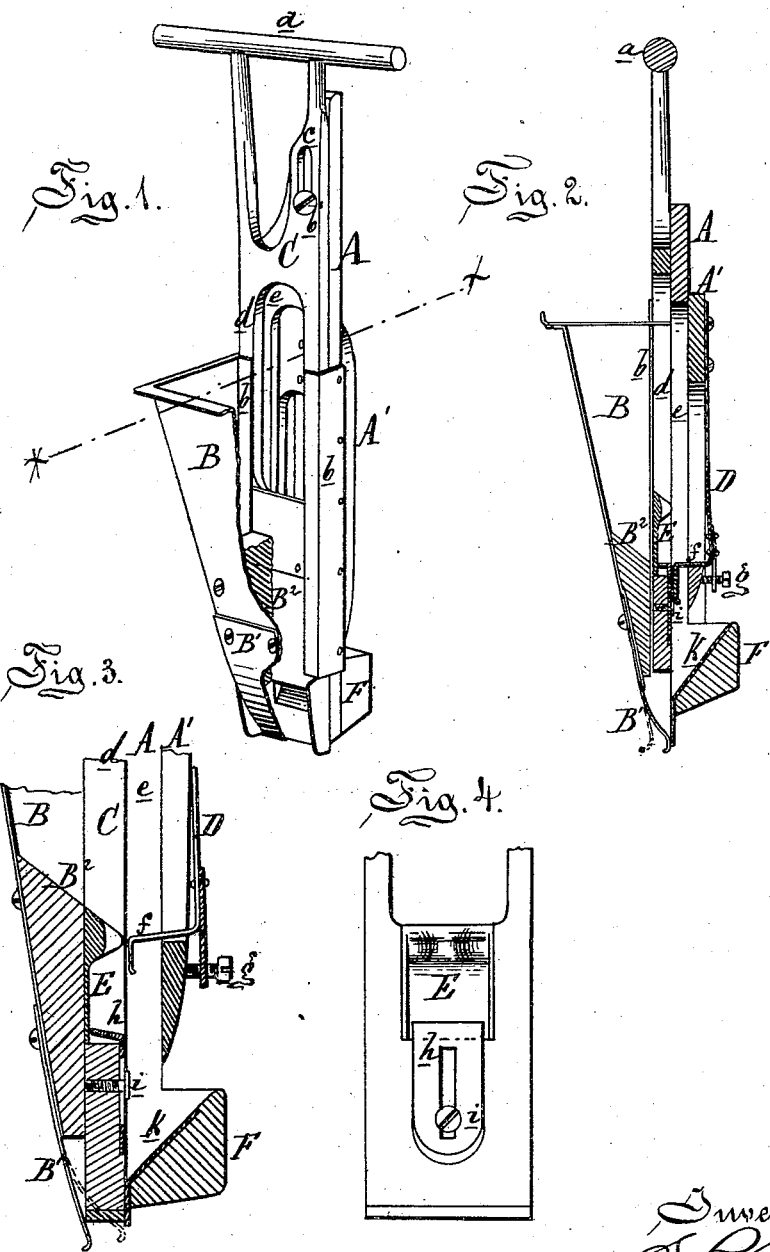

UNITED STATES PATENT OFFICE.

SYLVESTER P. BABCOCK, OF ADRIAN, MICHIGAN.

IMPROVEMENT IN HAND-PLANTERS.

Specification forming part of Letters Patent No. 183,527, dated October 24, 1876; application filed January 7, 1876.

*To all whom it may concern:*

Be it known that I, SYLVESTER P. BABCOCK, of Adrian, in the county of Lenawee and State of Michigan, have invented an Improvement in Hand Corn-Planters, of which the following is a specification:

My invention has relation to certain improvements in hand corn-planters; and consists, first, in a flange at each side of the hopper, covering the sides of a slotted plunger, to relieve the latter from the friction of the corn in the hopper; secondly, in a reciprocating measuring-cup, cut back on its "filling" side, in combination with a yielding cut-off, to prevent the choking of the grain and cutting it when caught between said cut-off and the top of the cup; thirdly, in the peculiar yielding cut-off, adjustable to various sizes of corn; and, fourthly, in a visible seed-cup, formed in the stop-block at the lower end of the planter, instead of a seed-cup separate therefrom.

Figure 1 is a perspective view of my planter, with a portion of the hopper broken away. Fig. 2 is a vertical cross-section of the same, on line $x\,x$, Fig. 1, both showing the plunger up. Fig. 3 is a similar view of the lower part, showing the plunger down. Fig. 4 is an elevation of the lower part of the plunger, showing the adjustable measuring-cup.

In the drawing, A represents the standard, to the sides of which I secure a sheet-metal hopper, B. C is a plunger, fitted with a handle, $a$, and reciprocates, through the bottom of the hopper, in the flanged guides $b\,b$, the lower part of the hopper having a spring-plate, $B^1$, secured thereto, which yields to allow the lower end of said plunger to pass through. The play of the plunger is limited by a screw, $b'$, in the standard passing into a slot, $c$, in the former. The body of the plunger, within the hopper, has a large slot, $d$, cut in it, the sides being covered by the flanges $b\,b$, which prevents all friction of the corn in the hopper upon said sides. The body of the standard has a large slot, $e$, cut vertically in it, which is closed by a wooden back plate, $A'$, which is, in turn, slotted, which slot is covered by a leaf-spring, D, secured to the top thereof, the lower end of which spring is turned angularly inward and downward to form the cut-off $f$. The closure of the cut-off toward the plunger is adjustable by means of the screw $g$, Figs. 2 and 3, as represented, the spring and cut-off being, however, free to move outward, yielding to the pressure of a kernel of corn lodged between it and the measuring-cup E, formed in the lower end of the slot in the plunger. The capacity of the said cup is adjusted by a movable bottom plate, $h$, having a slotted flange, through which a set-screw, $i$, passes, to clamp it at any desired elevation. The upper part, or the throat, of the measuring-cup is "cut back," or hollowed out, and the cut-off screw can be so adjusted as to let the cut-off close just enough to prevent corn of a given size from passing through the throat, while the cut-off will yield to allow a kernel lodged between them to pass as the plunger is drawn up, without breaking or cutting the kernel. The plunger slides against a block, $B^2$, in the bottom of the hopper. F is a stop-block secured to the lower back part of the standard, to arrest its descent into the ground. An inclined passage, $k$, is cut in this block, into which the seed drops from the cup, and passes thence under the plunger, saving the expense of the independent or separate visible seed-cup heretofore used.

What I claim as my invention is—

1. The combination, with the metal hopper B, of the slotted plunger and the guides $b\,b$, covering the exposed parts of the said plunger throughout the hopper, substantially as described and shown.

2. The combination, with the slotted plunger C and measuring-cup E, cut back on its filling side, of the cut-off spring D $f$, constructed and arranged substantially as described and shown.

3. The combination, with the hopper B, of the slotted standard A, slotted plunger C, slotted plate A, and spring D, constructed and arranged substantially as described and shown.

SYLVESTER P. BABCOCK.

Witnesses:
S. M. BABCOCK,
O. F. GREGORY.